United States Patent [19]
Dimur et al.

[11] Patent Number: 5,903,953
[45] Date of Patent: *May 18, 1999

[54] SCREEN WIPER ARM HAVING A SPRAY DEVICE FOR SPRAYING THE GLASS TO BE WIPED

[75] Inventors: Didier Dimur, Montigny-le-Bretonneux; Jean-Paul Boissac, Chatellerault, both of France

[73] Assignee: Valeo Systems D'Essuyage, La Verriere, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/495,851

[22] Filed: Jun. 28, 1995

[30] Foreign Application Priority Data

Jun. 30, 1994 [FR] France .................................. 94 08034

[51] Int. Cl.⁶ .................................. B60S 1/52; B60S 1/48
[52] U.S. Cl. .................................. 15/250.04; 15/250.351; 239/284.1
[58] Field of Search .......................... 15/250.04, 250.03, 15/250.02, 250.01, 250.32, 250.351; 239/284.1, 284.2

[56] References Cited

U.S. PATENT DOCUMENTS

| 3,149,361 | 9/1964 | Ziegler | 15/250.04 |
|---|---|---|---|
| 3,432,876 | 3/1969 | Edwards | 15/250.04 |
| 3,448,482 | 6/1969 | Close | 15/250.04 |
| 3,827,101 | 8/1974 | Wubbe | 15/250.04 |
| 3,913,167 | 10/1975 | Frigon | 15/250.04 |
| 4,133,071 | 1/1979 | Jaske | 15/250.04 |
| 5,327,614 | 7/1994 | Egner-Walter et al. | 15/250.04 |
| 5,398,370 | 3/1995 | Gorner et al. | 15/250.04 |
| 5,430,909 | 7/1995 | Edele et al. | 15/250.04 |

FOREIGN PATENT DOCUMENTS

| 552399 | 7/1993 | European Pat. Off. | 15/250.04 |
|---|---|---|---|
| 2119130 | 8/1972 | France . | |
| 2646801 | 11/1990 | France . | |
| 1087482 | 8/1969 | Germany . | |
| 2041600 | 2/1972 | Germany | 15/250.04 |
| 2340482 | 3/1975 | Germany | 15/250.04 |
| 41 30 023 | 3/1993 | Germany . | |
| 1295138 | 4/1962 | Italy | 15/250.04 |
| 345561 | 12/1992 | Japan | 15/250.04 |
| 2047079 | 11/1980 | United Kingdom | 15/250.04 |
| 92 21537 | 10/1992 | WIPO . | |

*Primary Examiner*—Gary K. Graham
*Attorney, Agent, or Firm*—Morgan & Finnegan, LLP

[57] ABSTRACT

A screen wiper element of generally elongate form, which is typically a screen wiper arm, comprises a body defining a longitudinal housing or recess, which is open in the lower face of the wiper element facing towards the swept surface such as a windshield. The longitudinal housing receives a feed pipe for supplying washing liquid to at least one spray device for spraying washing liquid on to the swept surface. The housing defined by the elongate screen wiper element includes a profile in the form of a groove complementary to the profile of the feed pipe.

15 Claims, 6 Drawing Sheets

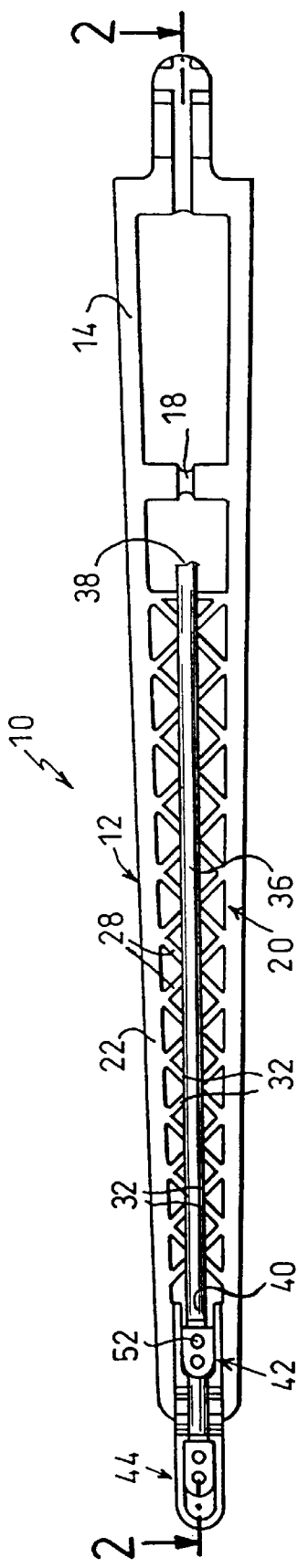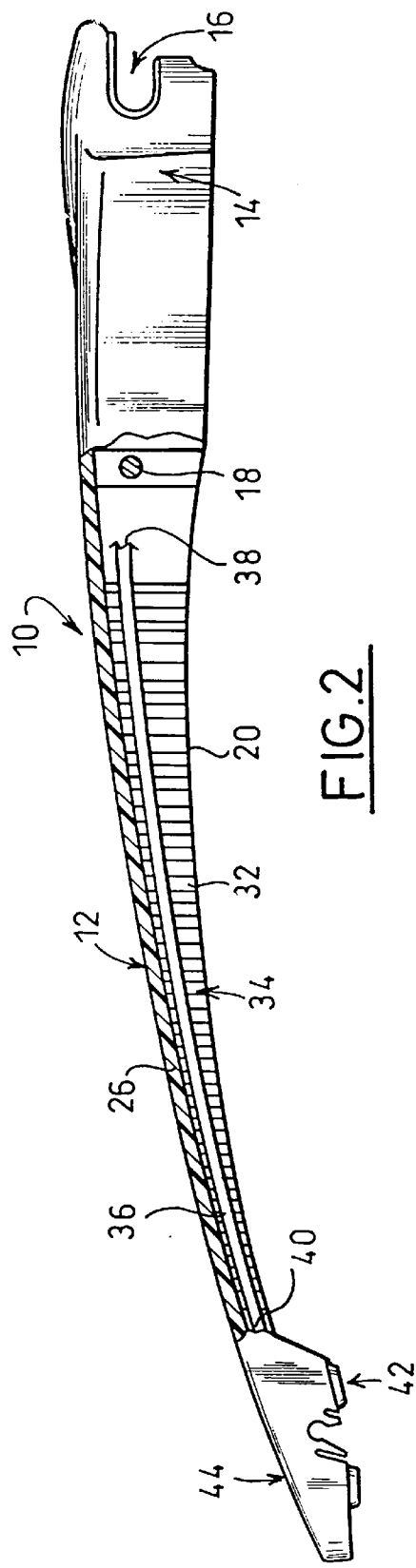

SCREEN WIPER ARM HAVING A SPRAY DEVICE FOR SPRAYING THE GLASS TO BE WIPED

FIELD OF THE INVENTION

The present invention relates to the design of a screen wiper element such as a screen wiper arm. More particularly, the invention relates to a screen wiper element of generally elongate form (typically the arm), with which there is associated a screen washing apparatus which includes a feed pipe for supplying washing liquid, the feed pipe being carried by the said elongate element and terminating at a spray member for spraying washing liquid on to the glass to be wiped. The glass to be wiped is also referred to herein as the swept surface.

BACKGROUND OF THE INVENTION

French published patent specification FR 1 295 138A describes and shows an arrangement of the kind described above, in which the screen wiper element or elongate member has a transverse cross section in the general form of an inverted U, which defines a longitudinal recess in the lower face of the screen wiper arm, which is open towards the swept surface, with the said recess receiving a flexible feed pipe in which the washing liquid flows, and which is arranged to supply with this liquid at least one spray device for spraying the liquid on to the swept surface, this spray device being disposed (for example) close to one free end of the screen wiper arm.

An advantage of that design is that it enables the flexible feed pipe to be protected, and it reduces the size of the liquid feeding system, while preserving good aerodynamic features of the screen wiper arm. However, the fitting of the flexible feed pipe into its housing makes it necessary to employ appropriate fastening devices, such as collars, arranged at various points on the screen wiper arm. This design thus calls for a relatively large number of costly components, and its assembly is particularly difficult to carry out using automatic assembly equipment.

In another known design that has been proposed, the flexible feed pipe is made integrally by moulding in the body of the screen wiper element or elongate member, the latter being again, in particular, the screen wiper arm. This arrangement avoids having to provide the feed pipe as a separate component, but it is particularly complex to achieve, and the moulding techniques which are necessary are too expensive.

DISCUSSION OF THE INVENTION

An object of the present invention is to propose a screen wiper element of the same general type as that described and shown in French published patent specification No. FR 1 295 138A, but which is of a less costly design and is simpler to achieve in practice, especially as regards the assembly of the components of the spray device on the screen wiper element.

According to the invention, therefore, a screen wiper element, of generally elongate form, the body of which defines a longitudinal housing which is open in the lower face of the element, facing towards the swept surface, the housing receiving a feed pipe in which flows a washing liquid, and the feed pipe being arranged to supply at least one spray device for spraying the said liquid on to the swept surface, is characterised in that the body of the said element is made by moulding, and in that the housing has a profile in the form of a groove complementary to the profile of the feed pipe.

The said screen wiper element according to the invention may be characterised by any one (or more than one) of the following features:

the said groove is delimited by a set of transverse walls which are made integrally by moulding with the body of the said screen wiper element, also referred to herein, and in the claims, as the elongate member;

the spray device includes a spray chamber arranged inside the body of the screen wiper element;

the spray chamber includes at least one spray nozzle oriented towards the swept surface;

the spray chamber includes at least one supply orifice or feed aperture for delivering washing liquid, this supply orifice being connected to one end of the feed pipe;

the spray chamber is formed in a spray member which is a separate component, and which is fitted into a cavity of the body of the screen wiper element;

the cavity may then be made integrally with the said body by moulding, and is open in the lower face of the body of the screen wiper element;

the said spray member is preferably a spray head which includes a feed connection through which it receives washing liquid, the said feed connection being arranged to be connected to a free end of the feed pipe;

as an alternative to forming it in a separate component, the spray chamber is made integrally by moulding with the body of the screen wiper element;

the spray chamber is then preferably delimited by at least one transverse wall comprising a supply orifice into which a free end of the feed pipe opens;

the screen wiper element has two successive spray chambers, arranged longitudinally, with, arranged between the two spray chambers, hydraulic connecting means connecting the two chambers together, while the screen wiper element further includes hooking means for attaching the wiper blade of the screen wiper on to the said screen wiper element;

the spray chamber is arranged close to the end of the screen wiper element;

the feed pipe is nested into the said groove constituting the housing;

alternatively, the body of the screen wiper element is moulded on to the feed pipe;

the spray member, where provided, is preferably nested in the said cavity;

the body of the screen wiper element is moulded on to the spray member;

the screen wiper element is a screen wiper arm.

Further features and advantages of the invention will appear more clearly on a reading of the detailed description of preferred embodiments of the invention which follows, and which is given by way of example only and with reference to the accompanying drawings.

BRIEF DESCRIPTION OF THE DRAWINGS

FIG. 1 is an underneath view of a screen wiper arm which is made in accordance with the present invention, having a spray device which comprises a double spray head.

FIG. 2 is a view in partial cross section taken on the line 2—2 in FIG. 1.

DESCRIPTION OF PREFERRED EMBODIMENTS OF THE INVENTION

Figure 3:
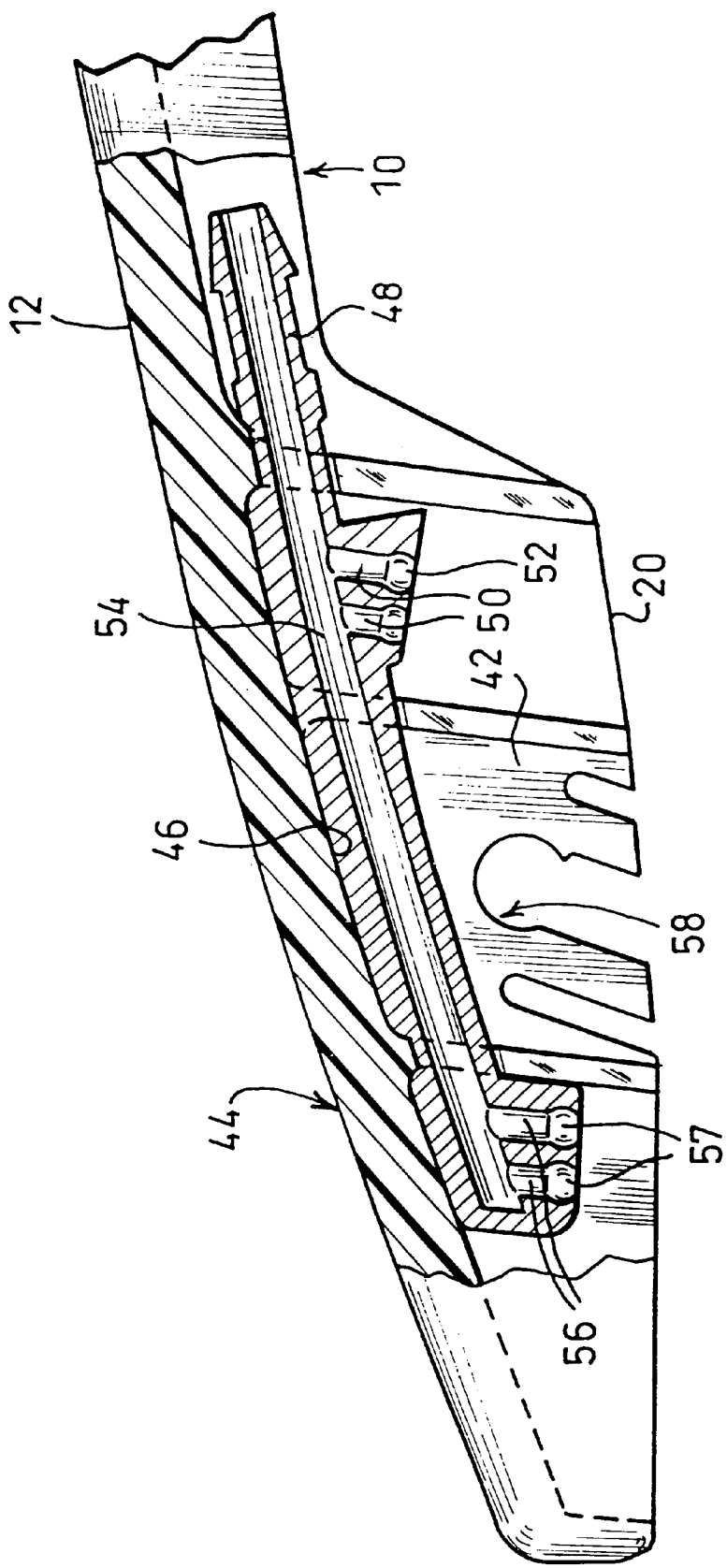
FIG. 3 is a view, in partial cross section taken on the line 2—2 in FIG. 1, of the free end portion of the screen wiper arm, shown on a larger scale.

The screen wiper arm 10 shown in FIGS. 1 and 2 is a generally elongate component comprising a body 12 which is moulded in one piece from a plastics material. The inner end portion 14 of the body 12 includes means 16 whereby the screen wiper arm is mounted, with articulation, on drive means (not shown) for driving the screen wiper in alternating rotary motion. The end portion 14 also includes a transverse bar 18 on which the pressure spring (not shown) of the screen wiper is hooked.

The body 12 of the screen wiper arm 10 is a moulded component which has a transverse cross section in the general form of an inverted U, defined by two parallel side portions 22 and 24 which are joined together through a back portion 26 at the top. The body 12 thus constitutes a longitudinal housing 30 which is open in the lower face 20 of the body 12, so as to face towards the glass surface to be swept (not shown). The interior of the body 12 of the screen wiper blade 10 is reinforced by a set of inclined transverse walls 28, arranged to form a grid and extending from the back portion 26 at the top to the lower face 20.

The body 12 of the wiper arm has a central longitudinal groove 34 which is bounded transversely by the vertical edges 32, in facing relationship with each other, of the walls 28. The groove 34 extends longitudinally over the whole length of the body 12, and its transverse width is slightly smaller than the diameter of a feed pipe 36 which is part of a screen washing apparatus for washing the swept surface being wiped.

The feed pipe 36 may be a flexible or semi-rigid pipe which, in the embodiment shown in the drawings, is fitted inside the open groove 34, behind the lower face 20 and within the interior of the wiper arm body 12. In the drawings, the feed pipe 36 is shown cut away in the region of one of its ends 38, this being the end which is arranged to be connected to the means (not shown) for supplying washing liquid, these means being part of the washing apparatus.

The outer end 40 of the feed pipe 36, which is its free end, is arranged to be connected to a spray head 42 for directing washing liquid on to the swept surface in the form of a spray.

As can be seen in FIG. 3, to which reference is now made, the free end portion 44 of the body 12 of the screen wiper blade 10 has a cavity 46 which is open in the lower face 20 of the body 12, and in which the spray head 42 is received. In the embodiment seen in FIGS. 1 to 3, the spray head 42 is a component which is attached to the body 12. It is held resiliently within the cavity 46, and has a feed connection 48 on which the free end 40 of the feed pipe 36 is received.

The spray head 42 has a first double spray chamber 50 which terminates in two spray nozzles 52. The nozzles 52 are oriented towards the swept surface. The double spray chamber 50 is connected with the feed connection 48 through a longitudinal duct 54, which is extended lengthwise towards a second double spray chamber 56 arranged at the free end of the spray head 42. This second spray chamber 56 again terminates in two spray nozzles, indicated at 57.

The duct 54 which connects the two double spray chambers 52 and 56 together extends above an intermediate portion of the free end portion 44 of the body 12 of the screen wiper arm. The latter includes hooking means 58, made integrally by moulding, on which a wiper blade is hooked on to the screen wiper arm body 12.

As can be seen in FIGS. 1 to 3, all of the housings, grooves, cavities and so on in the screen wiper arm body 12 are open towards its lower face 20. This greatly facilitates the moulding operations, which are carried out in a mould comprising a set of cores, all of which extend in the same direction.

After the body 12 has been moulded to form its cavities and housings, the assembly of the components of the washing apparatus is particularly simple, in that it consists in snap-fitting the flexible feed pipe 36 into the groove 34, and snap-fitting the spray head 42 into the cavity 46.

In a modified embodiment which is not shown in FIGS. 1 to 3, it is possible to mould the body 12 over the feed pipe 36 and the spray head 42, with these two components being exposed in the base of the mould, which defines the lower face 20.

Figure 4:
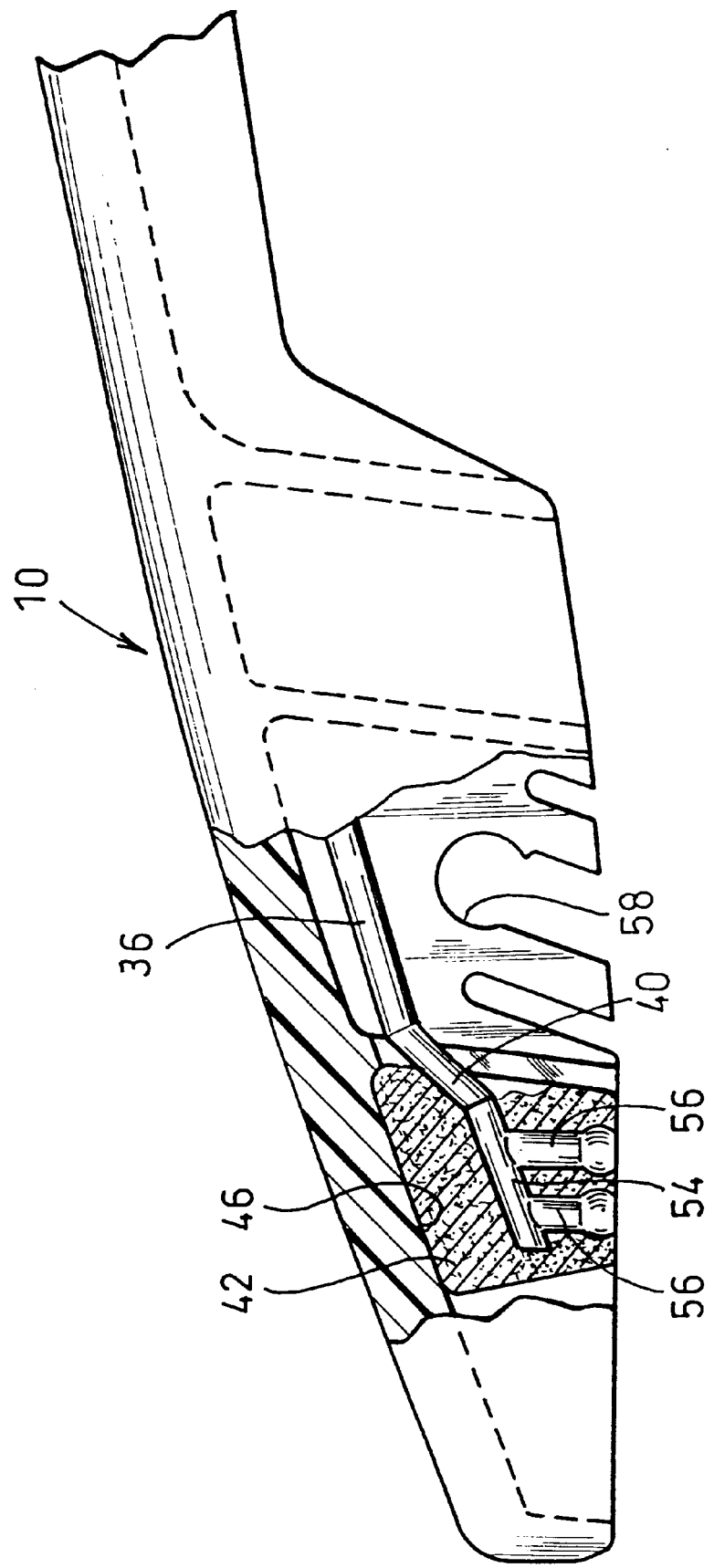
FIG. 4 is a view similar to FIG. 3, but shows a modified embodiment with a modified arrangement of the spray device.
Figure 5:
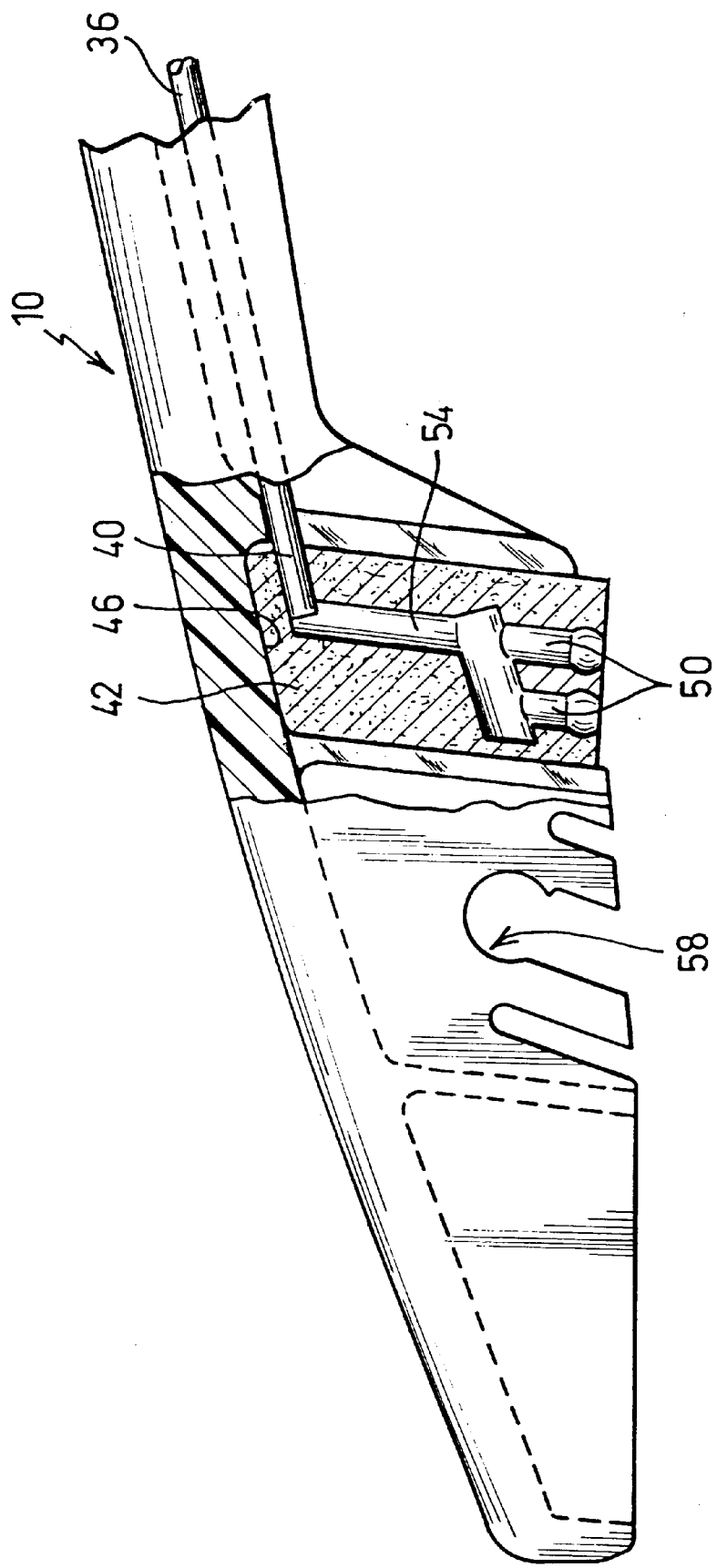
FIG. 5 is another view similar to FIG. 3, showing a further modification of the construction and arrangement of the spray device.

Reference is now made to FIGS. 4 and 5 showing modified embodiments. In these Figures, the spray device has only one double spray chamber, with its connecting duct 54. The spray chamber and the duct 54 are formed by moulding in a separate component, or attached member, 42. This member 42 is fitted into the cavity 46, which is located either, as in FIG. 5, behind the screen wiper blade 10, i.e. with the hooking means 58 between the cavity 46 and the free outer end of the wiper arm, or, as shown in FIG. 4, in front of the blade, i.e. between the hooking means 58 and the outer end of the arm.

It can thus be seen that the provision of a single moulded body 12 of plastics material enables a wide range of washing devices to be provided, of the general type having spray devices 42 of simple of multiple form, which are arranged in the cavity 46.

The spray head 42 made in the form of a moulded element may also be moulded on to the free end 40 of the feed pipe 36, with the assembly then being fitted in place in the form of a single component, by nesting it into the groove 34 and the cavity 46.

Figure 6:
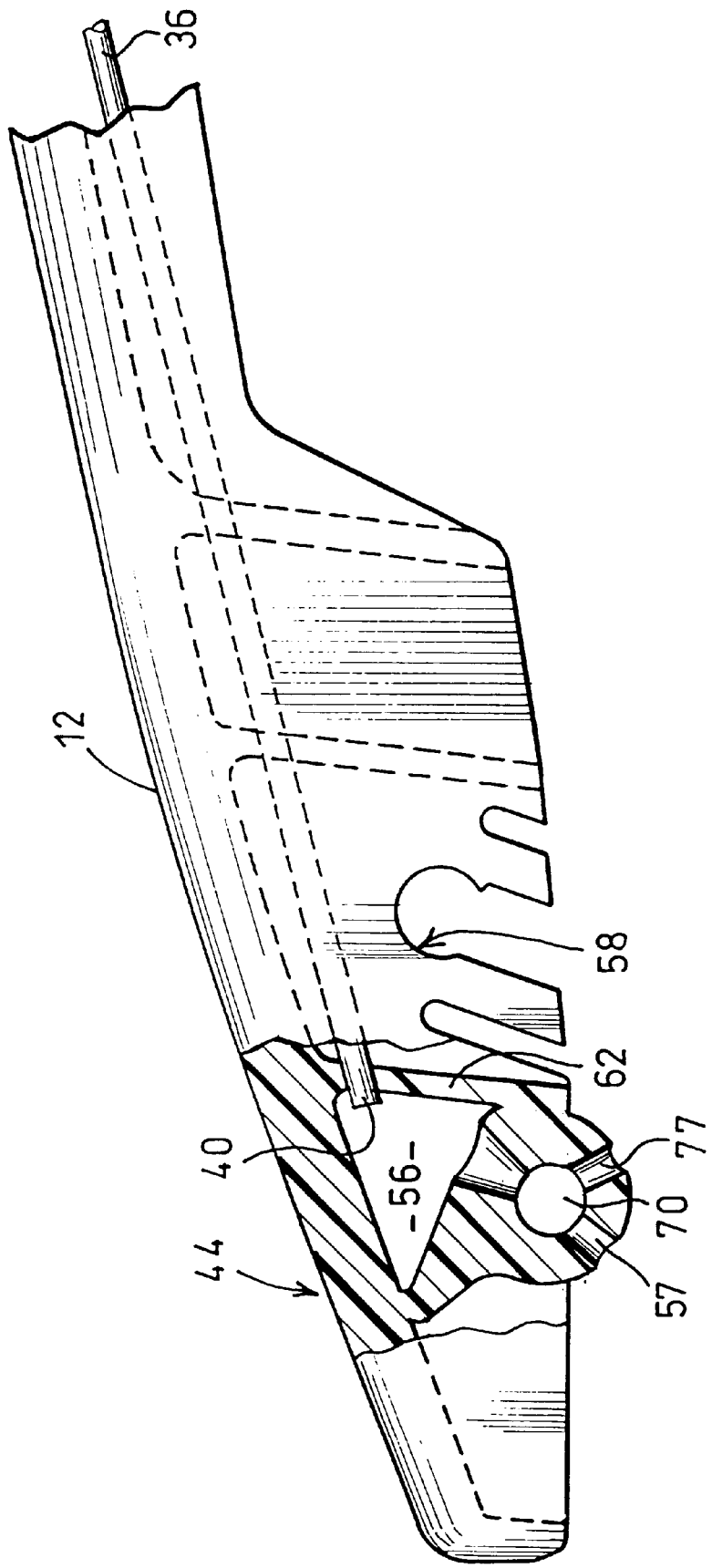
FIG. 6 is a view similar to FIG. 3, showing yet another modified arrangement of the spray device, in which the spray chambers are made integrally by moulding with the screen wiper arm.
Figure 7:
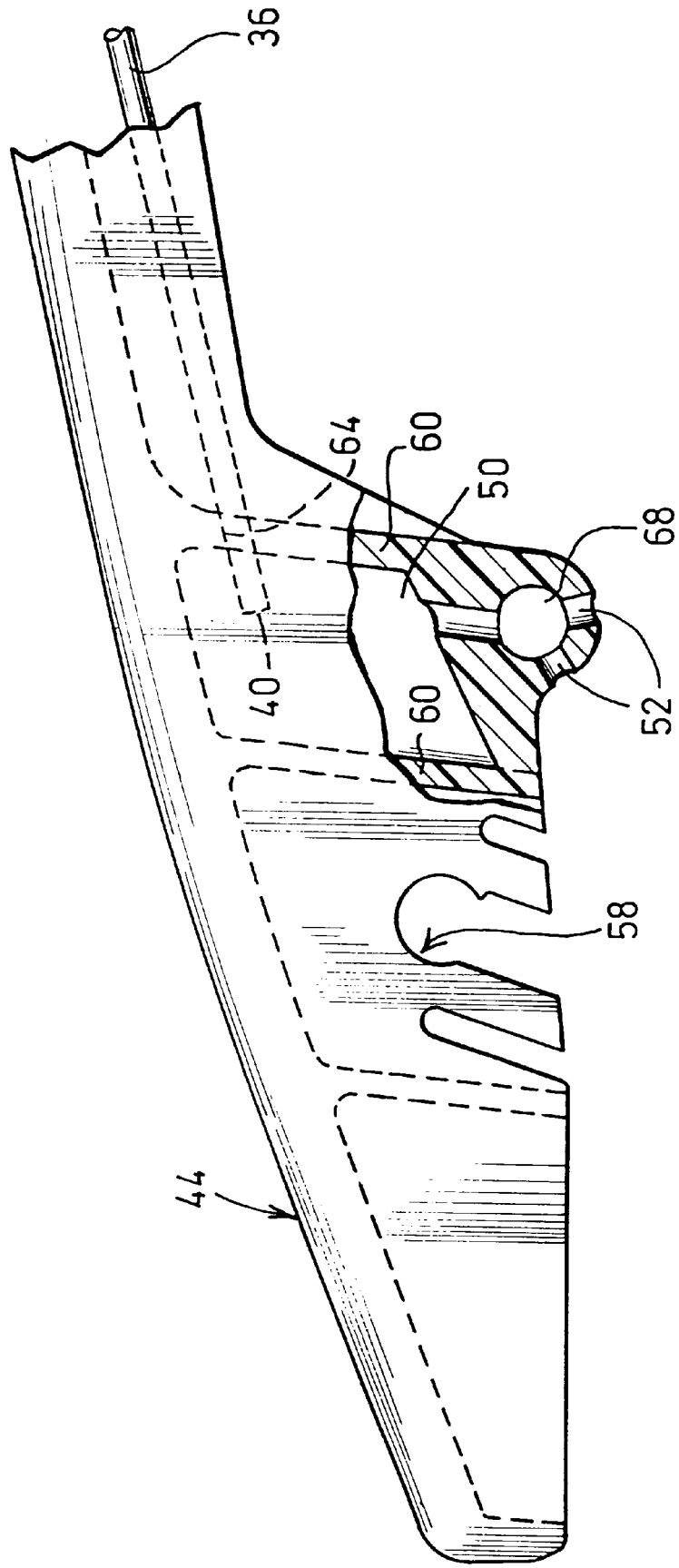
FIG. 7 is a view similar to FIG. 6, showing a still further embodiment.

Reference is now made to FIGS. 6 and 7, showing two further modified embodiments, each of which has a single spray chamber which is made integrally by moulding with the body 12. In this arrangement, the chamber 56 (FIG. 6) is bounded by a transverse wall 62, while in FIG. 7 the chamber 50 is bounded by two transverse walls 60. The wall 62 and at least one of the walls 60 are formed with a feed hole 64, in which the free end 40 of the feed pipe 36 is received.

The spray chamber 50 or 56 may be connected to the associated spray nozzles 52 and 57 respectively, through a turbulence chamber, 68 and 70 respectively. The various spray and turbulence chambers are made integrally by moulding, for example using a lost wax technique. FIGS. 6 and 7 show two end portions 44 of two separate bodies 12, but it is of course possible to make the two spray chambers simultaneously in the same body, and to use them, or not to use them, according to whether they are connected together and whether the first spray chamber 50 is connected to the feed pipe 36.

What is claimed is:

1. An elongate member for a screen wiper for sweeping a glass surface, in which the elongate member comprises:
   a body defining a face thereof, for facing towards the glass surface, the body further defining a longitudinal groove open in the face, wherein the body includes a plurality of integral reinforcing transverse walls forming a grid and defining edges of the groove;
   a semi-rigid feed pipe within the groove for flow of a washing liquid therein; and
   at least one spray device carried by the elongate member and in fluid communication with the feed pipe, for receiving washing liquid from the feed pipe and for directing a spray of the liquid on to the glass surface.

2. An elongate member according to claim 1, wherein the spray device includes a spray chamber within the said body.

3. An elongate member according to claim 2, wherein spray chamber has at least one spray nozzle.

4. An elongate member according to claim 2, wherein the spray chamber has at least one feed aperture in fluid communication with the feed pipe, for supplying washing liquid to the chamber.

5. An elongate member according to claim 2, wherein the body defines a cavity, and the spray device includes a separate spray member fitted in the cavity, the spray member defining the spray chamber.

6. An elongate member according to claim 5, wherein the cavity is formed integrally within the body and is open in the face of the body.

7. An elongate element according to claim 5, wherein the spray member is a spray head which includes a feed connection, the feed pipe having a free end connected to the feed connection to supply washing liquid to the spray head.

8. An elongate member according to claim 5, wherein the spray member is nested in the cavity.

9. An elongate member according to claim 5, wherein the said body is moulded on to the spray member.

10. An elongate member according to claim 2, wherein the spray chamber is formed integrally by moulding with the said body.

11. An elongate member according to claim 10, further having at least one transverse wall defining a feed aperture which delimits the spray chamber, the feed pipe having a free end which is open through the said feed aperture.

12. An elongate member according to claim 2, having two spray chambers disposed in succession in the body, and further including connecting means joining the two chambers together, and hooking means for attachment of another component of the screen wiper on the elongate member.

13. An elongate member according to claim 2, wherein the spray chamber is disposed close to a free end of the elongate member.

14. An elongate member according to claim 1, wherein the said body is moulded on to the feed pipe.

15. An elongate member according to claim 1, wherein the elongate member is a screen wiper arm.

* * * * *